Aug. 24, 1937. P. FRAY 2,090,790
ROTARY CUTTER FOR SUCTION DREDGES
Filed Sept. 21, 1934 3 Sheets-Sheet 1

Inventor
Peter Fray
By Lloyd W. Patch
Attorney

Aug. 24, 1937.   P. FRAY   2,090,790
ROTARY CUTTER FOR SUCTION DREDGES
Filed Sept. 21, 1934   3 Sheets-Sheet 2

Inventor
Peter Fray
By Lloyd W. Patch
Attorney

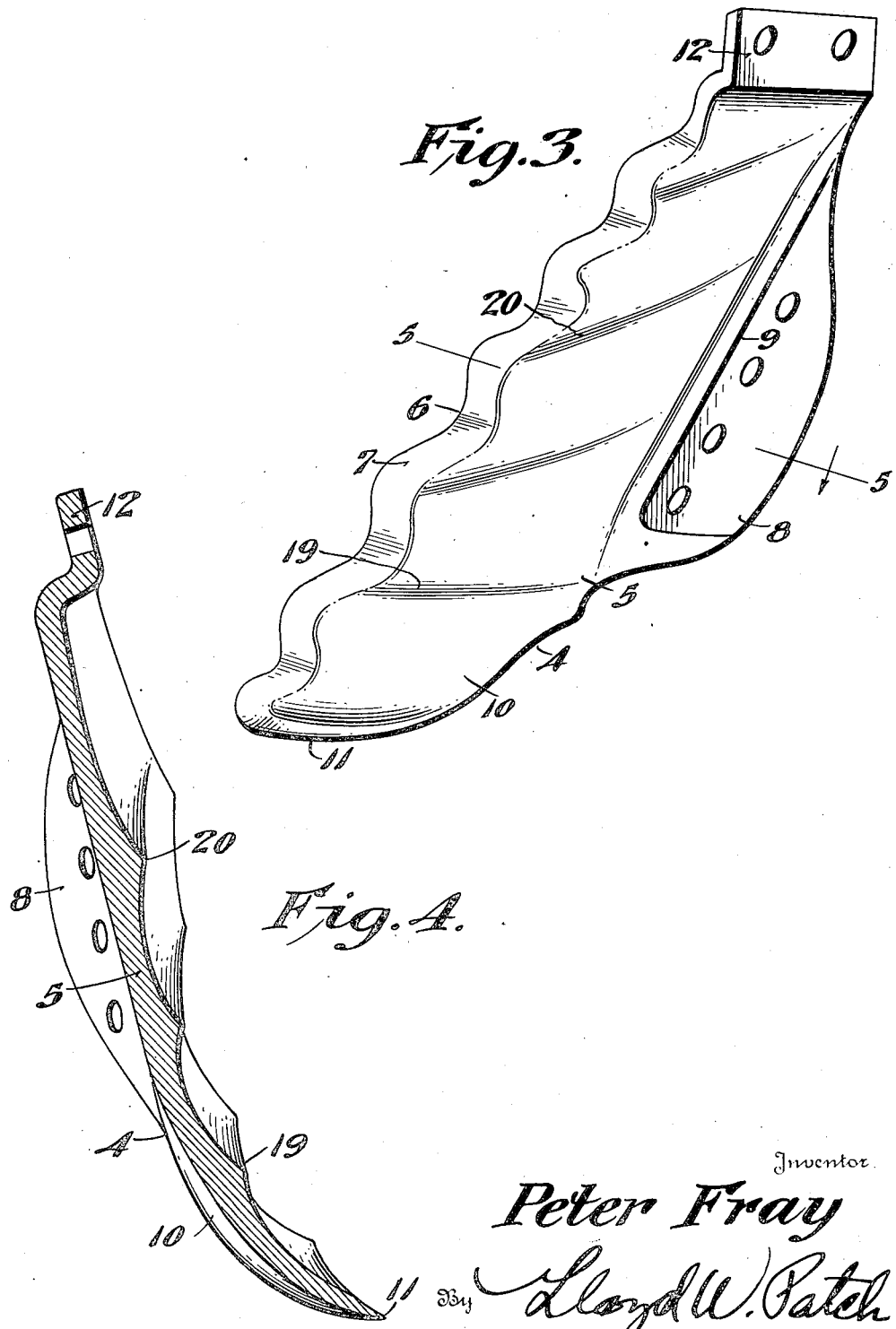

Patented Aug. 24, 1937

2,090,790

UNITED STATES PATENT OFFICE 2,090,790

ROTARY CUTTER FOR SUCTION DREDGERS

Peter Fray, Tampa, Fla.

Application September 21, 1934, Serial No. 744,989

5 Claims. (Cl. 37—67)

My invention relates to rotary cutters for suction dredges, and particularly to a cutter of this type adapted for use upon hydraulic pipe line or suction dredges, and in other connections, to cut and loosen clay, lime, sand, soft gravel, earth, and other materials, and to accumulate the loosened material for removal through a pipe line, or in any other desired manner, without danger of clogging or breakage of the parts.

The primary object of my invention is to provide a cutter of this character having a plurality of cutting or material loosening blades that will loosen the material and will initiate movement thereof in the direction of discharge, the construction being such that the blades will cut through and loosen hard or tightly packed material with greatest facility.

Another object is to so construct the parts that the cutting or forward edges of the blades will be scoured across by the loosened material to thus retain a sharp edge and to maintain the cutter head in condition for most efficient use, without danger or possibility of clogging of the parts.

A further object is to provide a rotary cutter head having the blades and the supporting portions thereof so constructed that the loosened material will be advanced or removed in the direction of discharge, as the cutter is advanced into the material.

Still another object of this invention is to provide a cutter head having a plurality of individual blades removably associated with a supporting structure common to all of the blades, and with which fastenings mounting the blades in place are substantially shielded and protected from wearing or other contact or influences from the material being handled, thus reducing the possibility of breakage and obviating the necessity of frequent replacement due to wear or damage of the fastenings.

With the above and other objects in view, which will be apparent to those skilled in the art, my invention includes certain novel features of construction and combinations of parts which will be hereinafter set forth in connection with the drawings and then pointed out in the claims.

In the drawings:

Fig. 3 is a view in elevation looking at the inner side of one of the individual cutter blades.

Fig. 4 is a view in elevation looking toward the cutting edge of the blade.

Figure 1:
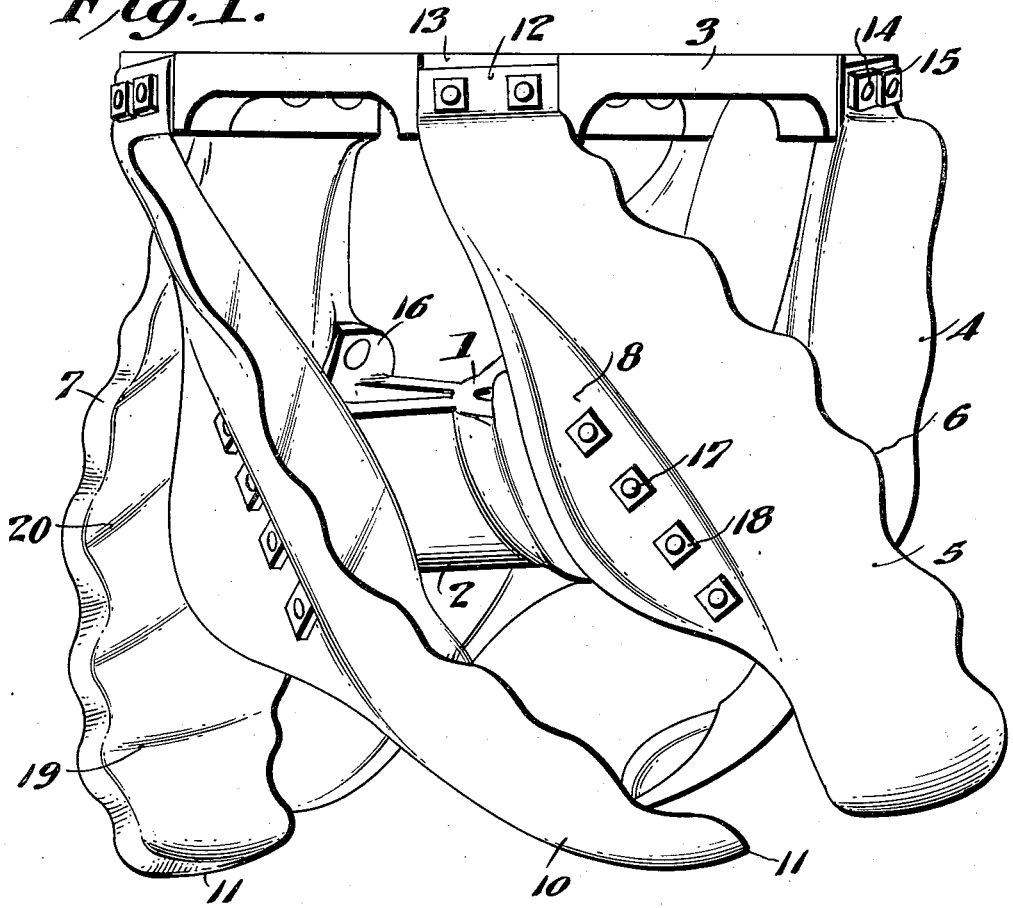
Figure 1 is a view in side perspective showing a rotary cutter constructed in accordance with my invention.

In the present instance I have shown my improved rotary cutter mounted upon and supported by a hub 1 having a plurality of supporting spokes 2, and a spreader ring 3. In use it has been found that the above manner of support serves the desired purpose, but as my invention resides in and relates primarily to the blade structure and associated parts, it will be appreciated that the supporting structure can be varied to suit different requirements of use and to adapt this rotary cutter to different types, styles and makes of dredging machines, and to varied and particular conditions of use.

A plurality of blades 4 are mounted upon and associated with the hub and spoke structure 1 and 2 and the ring member 3, to form the complete rotary cutter, and the parts are assembled and are secured together in a manner to be hereinafter more fully set forth.

Figure 5:
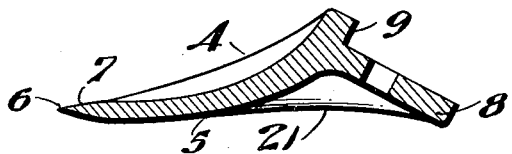
Fig. 5 is a sectional view transversely through the cutter blade, substantially on line 5—5 of Fig. 3.
Figure 2:
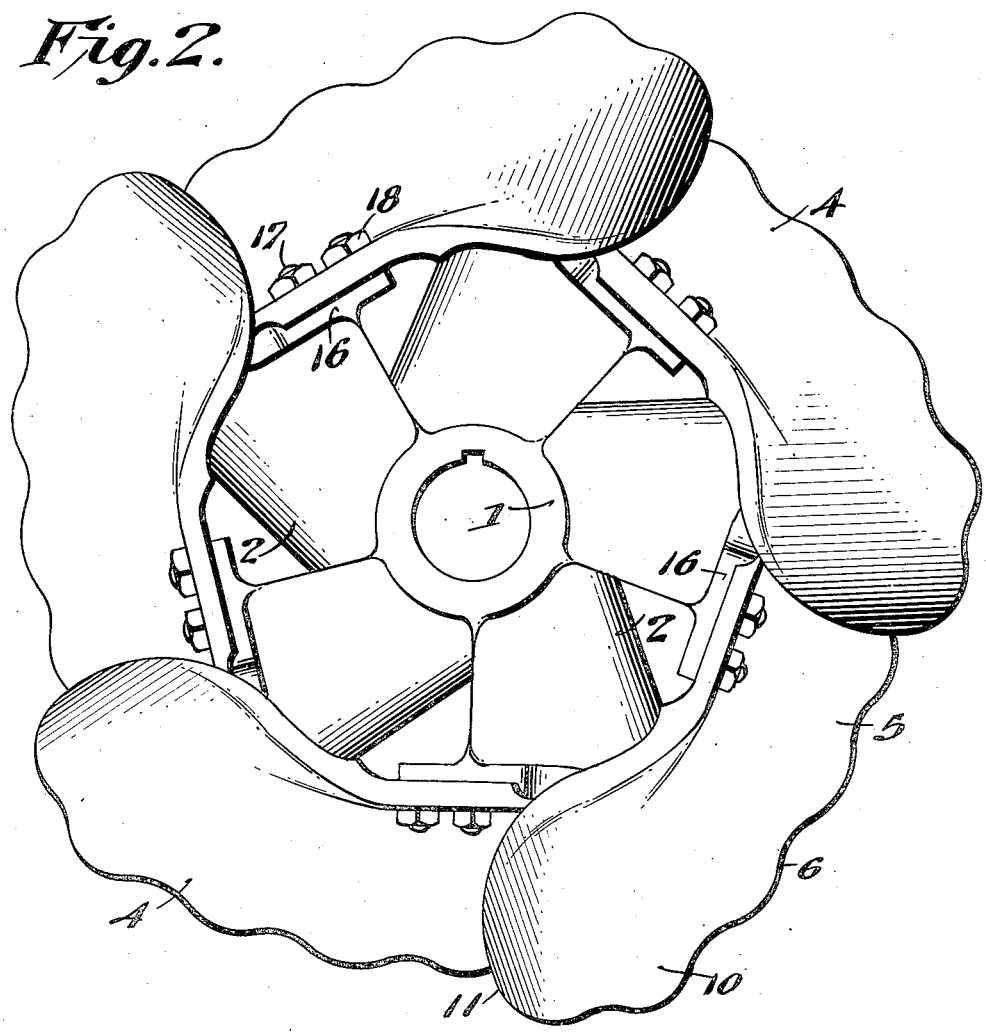
Fig. 2 is a view in end elevation, looking at the forward or cutting end.

Each individual blade 4 is constructed as a casting, forging, or is otherwise formed to have substantially the shape as best shown in Figs. 3, 4 and 5, and each blade has the body portion 5 thereof made of elongated form to mount in substantially a long helix around the center of rotation of the rotary head. The body portion 5 of each blade is made of undulating form along the cutting edge 6 substantially from one end to the other, and each blade is sharpened or cut back on its inner face, as at 7, to provide a sharpened cutting edge. The blade has at its back edge a mounting ear or extension 8, which is preferably provided with a mounting socket 9 to receive the ends of the spokes 2, in manner to be hereinafter more fully set forth. At its outer end each blade is substantially curved and drawn in, as at 10, and the extreme outer or forward end of each blade is sharpened, as at 11. The other end of each blade 4 is shaped to terminate in a mounting extension 12 adapted to be received in a correspondingly shaped recess 13 provided in the outer periphery of the ring 3. Bolts 14, having nuts 15, can be employed to secure the extensions 12 in conjunction with the ring 3.

Figure 6:
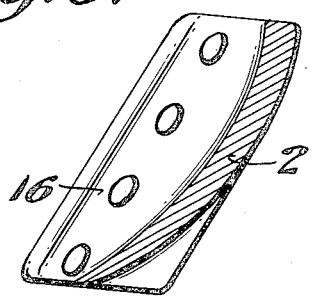
Fig. 6 is a fragmentary sectional view through one of the supporting spoke arms.

As best shown in Fig. 6, the spokes 2 extending from the hub 1 are inclined or angularly disposed somewhat after the manner of the blades of a fan, and each spoke has at its outer end a blade mounting head 16 adapted to be received in the socket opening 9 of the blade. The mounting head 16 and the mounting extension 8 of the blade are provided with registering openings to receive clamp bolts 17 having clamp nuts 18 screwed thereonto, or other suitable fastenings by which the blades will be rigidly secured and mounted upon and associated with the hub portion 1 and its associated spokes 2. With this mounting, the several individual blades 4 are assembled into a structure that will rotate and function substantially as a unit, and as the fastenings 14 and 17 and the nuts 15 and 18 are disposed substantially in recessed portions of the blade and are consequently out of position to have direct contact with and receive the full scouring force of the earth or material being moved, there is little likelihood that the fastenings will become worn or damaged, while the device is in use.

The body 5 of each of the blades 4 is mounted to have the cutting end thereof extend substantially in the line of a helix taken around the center of rotation, and as the undulating cutting edges are inclined and disposed outwardly from the main body of the structure, the material being cut will be substantially accumulated within the space defined by the several cutting blades, to be from there discharged into the usual tube and then conducted to a desired point of discharge.

On the inner face of its body 5, each of the cutter blades 4 has the surface substantially corrugated to provide a plurality of rib formations or portions 19 and 20, which portions 19 and 20 follow substantially the line of a helix taken around the axis of rotation. The ribs 19 are preferably formed on a somewhat shorter pitch than the ribs or corrugations 20, and in this way the rate of propelled movement of the earth or other material being handled will be appreciably increased as the material is carried or moved from a point adjacent to the cutting edges 11 and 6, and will be advanced to be discharged through the hose or other discharge conducting means. In this manner, the cutter head serves not alone to loosen earth or other material, but also to initiate and positively cause movement of the material toward a suction hose, or other means by which the material is to be carried and advanced.

The spokes 2 radiating from the hub 1 are so formed and so disposed, as is better shown in Fig. 6, that they will serve to draw in and propel the loose earth or other material being excavated, and in this manner the entire structure serves and functions to cut, to loosen, to accumulate, and to advance the loosened material toward the ring 3, where the loosened material will be taken up and will be conveyed away by a suction hose, or other suitable means not shown.

As has been stated, the entire cutter can be rotated in any desired manner, and in the present instance I have shown the hub 1 provided with a central opening to receive a shaft or other rotating member, the hub being secured in place in any desired manner, as by a key, spline, pin, or other rigidly mounting means, or being threaded to be screwed onto the correspondingly threaded end of the dredge shaft, being held in place by clamp bolts, or being secured and mounted in any other desired and suitable manner.

As shown, the portions 8 and 12 through which the fastenings are fitted and secured are somewhat offset or recessed, to thus insure that the bolts and nuts, or other fastenings as employed to mount the blades in place, will be set back sufficiently from the peripheral path of travel of the cutting blades 6 so that these fastenings will not be submitted to grinding and cutting wear of the loosened material to thus become damaged, broken, or otherwise rendered inefficient or inoperative. As shown in Fig. 5, strengthening ribs 21 can be provided to reinforce between the blade portions 5 and the securing or mounting portions 8, and it will be appreciated that any additional strengthening and reinforcing portions can be provided, as may be desired or necessary.

As is illustrated, the blades have the undulating forward or cutting edges 6 thereof disposed outwardly so that the body portion 5 of each blade is inclined or curved inwardly from a peripheral line representing the outer line of excavation or cut. With this arrangement and mounting of the parts, the blades serve to draw in the cut and loosened or excavated material toward the center of rotation, and full effect is given to the propelling action accomplished by the ribs 19 and 20.

As stated, the undulating cutting edge 6 is sharpened or reduced on its inner side, as at 7, and it is preferable that this sharpening be accomplished by reducing or beveling in a manner to substantially follow and conform with the path of travel of the earth or other material as cut away. Also, the sharpening at 11 is accomplished by beveling on the inner side of the blade in similar manner. With this construction, as the earth, gravel, or other material is cut and is drawn in by the several blades 4, the material will scour across the beveled edge or face at 7, in consequence of which this face is worn away uniformly to maintain the desired bevel and to insure a sharp cutting edge at all times. The rib formations 19 and 20 serve to augment this travel or movement of the material away from the undulating forward edges 6, to thus leave the freshly cut or excavated material a free path of movement across the beveled face at 7, and the corresponding beveled face of the cutting edge 11.

As my invention relates primarily to the rotary cutter or head, it has not been deemed necessary to show, describe, or otherwise disclose connecting and associated parts of a suction dredge or other mechanism, and it will be appreciated that the dredge, suction and operating mechanism can be of various types, constructions, mountings, and arrangements, as may be required for particular adaptations and uses.

While I have herein shown and described only certain specific embodiments of my invention and have suggested only certain possible modifications and variations, it will be appreciated that many changes can be resorted to in the various features, in the assembly, in the adaptation for use, and in other respects, without departing from the spirit and scope of my invention.

I claim:

1. A rotary cutter for excavators comprising, a rotatable supporting structure, a plurality of cutting blades associated with said supporting structure and having undulating cutting edges disposed outwardly and in substantially helical arrangement with respect to the axis of rotation, said blades each having offset mounting portions disposed inwardly from the peripheral path of movement of the cutting edges, and fastening means associated with the supporting structure and said mounting portions to thus be protected from contact with the material being cut, said cutting blades having the inner sides thereof beveled along the undulating forward edges to provide a sharpened cutting edge over which the material being cut is carried with a scouring action by rotation of the cutter head to thus maintain a sharp cutting edge, each of said cutter blades being provided on its inner face with rib portions inclined inwardly and with the incline at one end of the blade on a relatively steeper pitch than at the other end of the blade.

2. A rotary cutter for excavators comprising, a hub having supporting spokes and a ring to be rotated with said hub, and a plurality of cutting blades mounted on said hub and ring structure to be rotated therewith and having outstanding forwardly disposed undulating edges, said cutting blades having the inner face thereof adjacent to the undulating edge beveled to provide a sharpened cutting line along the undulating edge and having ribs formed on the inner side of the body portion in inclined relation with the ribs toward the ring inclined on a steeper pitch than the ribs at the outer end of the blade.

3. A blade for rotary cutters for excavators comprising, a body portion of elongated form curved at one end and provided at one side extremity with an undulating edge, said blade having fastening receiving mounting portions inset in the outer surface at points opposite the undulating edge and the curved end, the blade being beveled on its inner face along the undulating line to form a cutting edge and being provided on its inner face with inclined ribs in which the ribs are inclined on relatively steeper pitch away from the curved end.

4. A rotary cutter for excavators comprising, a rotatable hub, and a plurality of cutting blades rigidly mounted on said hub to be rotated therewith and inclined substantially helically with respect to the axis of rotation, said cutting blades having the inner faces thereof ribbed obliquely and being reduced in thickness at their forward edges to provide sharpened cutting edges of undulating shape due to the rib forms on the inner sides of the blades.

5. A rotary cutter comprising, a rotatable supporting structure, and a plurality of blades mounted on and carried by said supporting structure in helical disposition and in substantially peripheral arrangement around the axis of rotation thus disposed to cut earthy material as the cutter is rotated and is advanced axially, said blades being grooved and ribbed on their inner sides and being sharpened at their forward edges to provide undulating cutting edges to shear off and loosen the earthy material and rib and groove inner surfaces to carry the loosened material axially rearwardly as the cutter is rotated and is advanced axially forwardly.

PETER FRAY.